(12) United States Patent
Ambrose et al.

(10) Patent No.: US 7,541,105 B2
(45) Date of Patent: Jun. 2, 2009

(54) EPITAXIAL FERROELECTRIC AND MAGNETIC RECORDING STRUCTURES INCLUDING GRADED LATTICE MATCHING LAYERS

(75) Inventors: Thomas Francis Ambrose, Sewickley, PA (US); Joachim Walter Ahner, Pittsburgh, PA (US); Kai-Chieh Chang, Wexford, PA (US); Maissarath Nassirou, Pittsburgh, PA (US); Robert Hempstead, Pittsburgh, PA (US); Mark Lutwyche, Reisterstown, MD (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/526,413

(22) Filed: Sep. 25, 2006

(65) Prior Publication Data

US 2008/0075980 A1 Mar. 27, 2008

(51) Int. Cl.
*G11B 5/66* (2006.01)
(52) U.S. Cl. ............... 428/831; 428/826; 428/846.2; 428/846.4; 428/840.1; 428/842
(58) Field of Classification Search ............ 428/831, 428/846.2, 826, 827, 839, 848.1, 811.2, 813, 428/832.1
See application file for complete search history.

(56) References Cited

U.S. PATENT DOCUMENTS

| | | |
|---|---|---|
| 4,136,350 A | 1/1979 | Tien |
| 4,548,658 A | 10/1985 | Cook |
| 4,719,155 A | 1/1988 | Matsumoto |
| 4,833,101 A | 5/1989 | Fujii |
| 4,928,154 A | 5/1990 | Umeno et al. |
| 5,141,894 A | 8/1992 | Bisaro et al. |
| 5,225,031 A | 7/1993 | McKee et al. |
| 5,302,232 A | 4/1994 | Ebe et al. |
| 5,347,157 A | 9/1994 | Hung et al. |
| 5,358,895 A | 10/1994 | Steele et al. |
| 5,394,826 A | 3/1995 | Ebe et al. |
| 5,529,980 A | 6/1996 | Gupta |
| 5,567,979 A * | 10/1996 | Nashimoto et al. .......... 257/627 |
| 5,612,292 A | 3/1997 | Gupta |
| 5,659,187 A | 8/1997 | Legoues et al. |
| 5,759,265 A * | 6/1998 | Nashimoto et al. .......... 117/105 |
| 5,770,868 A | 6/1998 | Gill et al. |
| 5,846,648 A * | 12/1998 | Chen et al. .................. 428/332 |
| 5,985,404 A | 11/1999 | Yano et al. |

(Continued)

FOREIGN PATENT DOCUMENTS

WO  WO9924973 A1  5/1999

(Continued)

*Primary Examiner*—D. Lawrence Tarazano
*Assistant Examiner*—Gary D Harris
(74) *Attorney, Agent, or Firm*—Robert P. Lenart, Esq.; Pietragallo Gordon Alfano Bosick & Raspanti, LLP

(57) ABSTRACT

Epitaxial ferroelectric and magnetic recording structures having graded lattice matching layers are disclosed. A single crystal material such as Si may be used as a substrate material upon which the graded lattice matching layers are deposited. The lattice matching layers may comprise metals and metal alloys, or may comprise oxides doped with selected elements or deposited under different oxygen pressures. A recording layer, such as ferroelectric lead zirconium titanate or a magnetic Fe/Pt multilayer structure, is deposited on the graded lattice matching layers.

13 Claims, 7 Drawing Sheets

U.S. PATENT DOCUMENTS

| | | | |
|---|---|---|---|
| 6,151,240 | A | 11/2000 | Suzuki |
| 6,214,712 | B1* | 4/2001 | Norton ........................ 438/591 |
| 6,248,416 | B1 | 6/2001 | Lambeth et al. |
| 6,270,574 | B1 | 8/2001 | Hooper |
| 6,329,063 | B2 | 12/2001 | Lo et al. |
| 6,331,364 | B1* | 12/2001 | Baglin et al. ................. 428/830 |
| 6,510,074 | B2* | 1/2003 | Miyazawa et al. ........... 365/145 |
| 6,639,249 | B2* | 10/2003 | Valliath ......................... 257/88 |
| 6,642,539 | B2* | 11/2003 | Ramesh et al. ................. 257/43 |
| 2002/0018920 | A1* | 2/2002 | Yamamoto et al. ..... 428/694 TS |
| 2002/0072130 | A1 | 6/2002 | Cheng et al. |
| 2002/0144645 | A1 | 10/2002 | Kim et al. |
| 2002/0154532 | A1* | 10/2002 | Miyazawa et al. ........... 365/145 |
| 2003/0062553 | A1* | 4/2003 | Ramesh et al. ............... 257/295 |
| 2003/0168654 | A1 | 9/2003 | Cheng et al. |
| 2004/0151949 | A1 | 8/2004 | Oikawa et al. |
| 2005/0009288 | A1 | 1/2005 | Cheng et al. |
| 2005/0069733 | A1 | 3/2005 | Ajan et al. |

FOREIGN PATENT DOCUMENTS

| | | |
|---|---|---|
| WO | WO0209203 A2 | 1/2002 |

* cited by examiner

US 7,541,105 B2

EPITAXIAL FERROELECTRIC AND MAGNETIC RECORDING STRUCTURES INCLUDING GRADED LATTICE MATCHING LAYERS

FIELD OF THE INVENTION

The present invention relates to epitaxial ferroelectric and magnetic recording structures, and more particularly relates to the use of graded lattice matching layers between a single crystal substrate and a ferroelectric or magnetic recording layer in such structures.

BACKGROUND INFORMATION

Growth of highly oriented epitaxial thin films has received increased interest due to their magnetic and transport properties. Such oriented films can enhance specific properties such as magnetic anisotropy that are dependent upon crystallographic direction. For example, an $L1_0$ FePt film used as a perpendicular magnetic recording medium requires a (001) texture such that the easy axis of magnetization lies orthogonal to the film plane. As another example, a thin film of lead zirconium titanate (PZT) may be c-axis oriented between top and bottom electrodes in a ferroelectric capacitor for optimal electrical properties.

There are numerous single crystal substrates such as GaAs, InAs, $SrTiO_3$ and $LaAlO_3$ that provide adequate lattice spacing and crystal structure for epitaxial growth of single crystal metals and oxides used in data storage and other applications. However, these substrates are quite expensive compared with basic silicon substrates, which limits their use considerably. A more economical approach would be to start with a relatively inexpensive substrate, such as silicon, and deposit metal or oxide films on the substrate with a well defined orientation and crystal structure that mimics a single crystal material.

Epitaxial ferroelectric thin films deposited on silicon wafers have potential for high density probe storage media. However, there are challenges in using epitaxial ferroelectric thin films for high-density probe recording media. Defects in the film should be minimized. In particular, grain boundaries and voids should be avoided because they act as channels for leakage current and increase the media noise. In addition, the polarization value should be maximized in order to achieve a higher read signal and thermal stability. Furthermore, surface roughness should be minimized in high-density recording applications. Surface morphology plays a major role in domain wall pinning and affects recording jitter and data density.

SUMMARY OF THE INVENTION

The present invention provides epitaxial ferroelectric and magnetic recording structures having graded lattice matching layers. A single crystal material such as Si may be used as a substrate material upon which the graded lattice matching layers are deposited. The lattice matching layers may comprise metals and metal alloys, or may comprise oxides doped with selected elements or deposited under different oxygen pressures. A recording layer, such as ferroelectric lead zirconium titanate or a magnetic Fe/Pt multilayer structure, is deposited on the graded lattice matching layers.

An aspect of the present invention is to provide an epitaxial recording structure comprising a single crystal substrate having a lattice constant, a seed layer deposited on the substrate having a lattice constant substantially matching the substrate lattice constant, graded lattice matching layers comprising a lowermost lattice matching layer and an uppermost lattice matching layer deposited on the seed layer, and a recording layer having a lattice constant deposited on the graded lattice matching layers. The lowermost lattice matching layer has a lattice constant substantially matching the seed layer lattice constant, and the uppermost lattice matching layer has a lattice constant substantially matching the recording layer lattice constant.

Another aspect of the present invention is to provide a ferroelectric recording structure comprising a single crystal substrate having a lattice constant, a seed layer deposited on the substrate having a lattice constant substantially matching the substrate lattice constant, graded lattice matching layers comprising a lowermost lattice matching layer and an uppermost lattice matching layer deposited on the seed layer, and a ferroelectric recording layer having a lattice constant deposited on the graded lattice matching layers. The lowermost lattice matching layer has a lattice constant substantially matching the seed layer lattice constant, and the uppermost lattice matching layer has a lattice constant substantially matching the recording layer lattice constant.

A further aspect of the present invention is to provide a magnetic recording structure comprising a single crystal substrate having a lattice constant, a seed layer deposited on the substrate having a lattice constant substantially matching the substrate lattice constant, graded lattice matching layers comprising a lowermost lattice matching layer and an uppermost lattice matching layer deposited on the seed layer, and a magnetic recording layer having a lattice constant deposited on the graded lattice matching layers. The lowermost lattice matching layer has a lattice constant substantially matching the seed layer lattice constant, and the uppermost lattice matching layer has a lattice constant substantially matching the recording layer lattice constant.

These and other aspects of the present invention will be more apparent from the following description.

DETAILED DESCRIPTION

The present invention provides epitaxial recording structures comprising single crystal substrates and either ferroelectric or magnetic recording layers. Graded lattice matching layers are deposited between the substrate and the recording layer. As used herein, the term "single crystal" means a homogeneous solid formed by a repeating three-dimensional pattern of atoms, ions or molecules which contains substantially no defects. The term "epitaxial" means an extended single crystal film grown on top of a single crystal substrate in which the crystallographic structure of the film mimics the crystal structure of the underlying substrate. The term "graded lattice matching layers" means that the lattice constant of each lattice matching layer is sufficiently close to each adjacent lattice matching layer such that the inplane lattice mismatch between adjacent layers is lower than 2 percent, typically lower than 1 percent. For example, the lattice constant of each lattice matching layer may typically be within 0.05 Å of each adjacent lattice matching layer, for example, within 0.02 Å of each adjacent lattice matching layer.

Figure 1:
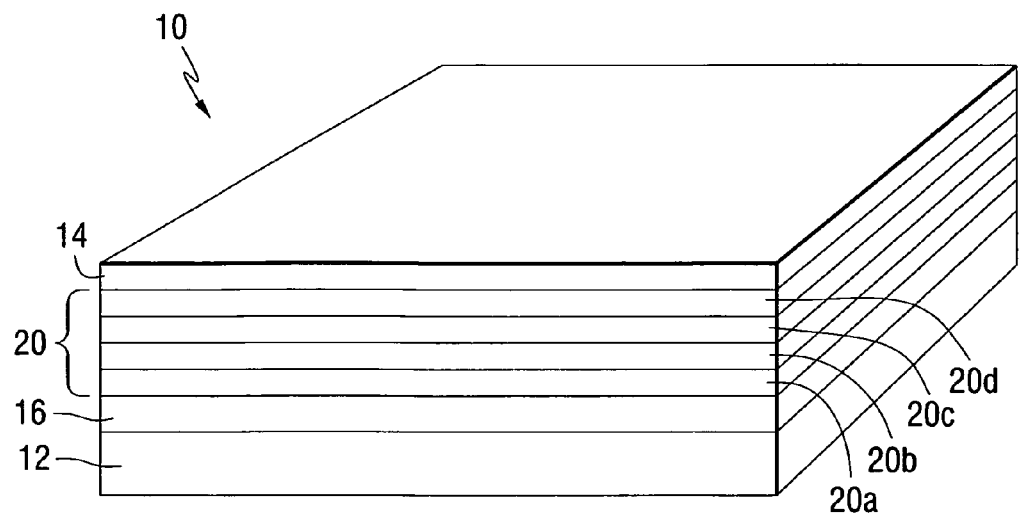
FIG. 1 is a partially schematic isometric view of an epitaxial recording structure including graded lattice matching layers in accordance with an embodiment of the present invention.

FIG. 1 illustrates a recording structure 10 in accordance with an embodiment of the present invention. The recording structure 10 comprises a substrate 12 made of a single crystal material such as Si, SiGe, SrTiO$_3$ (STO) or LaAlO$_3$. The recording structure 10 also includes a recording layer 14 which may comprise a ferroelectric material such as PZT, BaTiO$_3$ (BTO), (Ba$_x$Sr$_{1-x}$)TiO$_3$ (BSTO), SrBi$_2$Ta$_2$O$_9$ (SBT) or PbTiO$_3$ (PTO), or a magnetic material such as FePt multilayers, CoPt$_3$ or CoCrPt. The recording layer has a typical thickness of from about 10 to about 50 nm.

A seed layer 16 is deposited on the substrate 12. The seed layer 16 may comprise Cu, SiGe, STO, (Sr$_x$Ru$_{1-x}$)TiO$_3$ (SRTO), (La$_x$Sr$_{1-x}$)TiO$_3$ (LSTO) or (La$_{2-x}$Sr$_x$)CuO$_4$ (LSCO), and may have a typical thickness of from about 4 to about 100 nm.

As shown in FIG. 1, a graded lattice matching structure 20 is deposited between the seed layer 16 and the recording layer 14. In the embodiment shown in FIG. 1, the lattice matching structure 20 has four lattice matching layers 20a, 20b, 20c and 20d. However, any suitable number of lattice matching layers may be used. For example, from 2 to 40 lattice matching layers may be used.

Each lattice matching layer 20a, 20b, 20c and 20d typically has a thickness of from about 4 to about 100 nm, for example, from about 4 to about 10 nm. The total thickness of the graded lattice matching layers 20 is typically from about 10 to about 200 nm, for example, from about 50 to about 100 nm.

Figure 2:
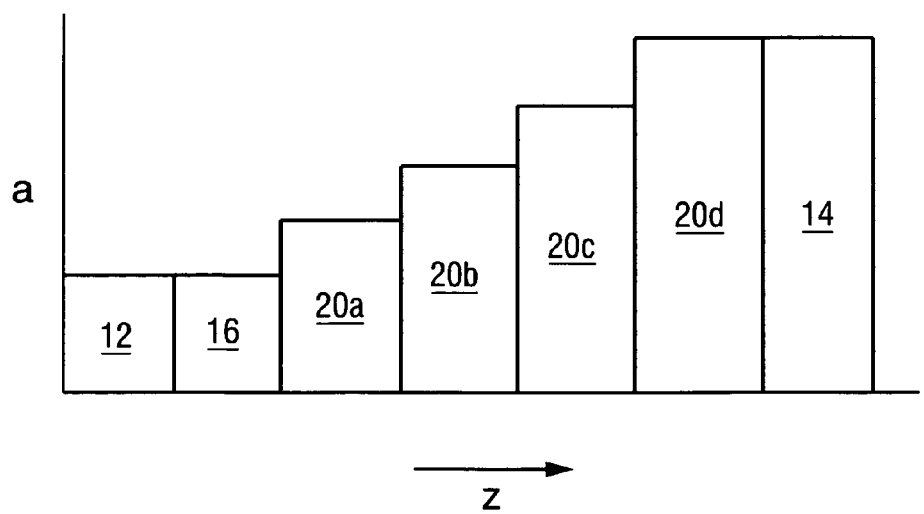
FIG. 2 is a graph of lattice constant (a) versus cross sectional direction (z) illustrating graded lattice matching between a substrate and a recording layer in accordance with an embodiment of the present invention.

FIG. 2 plots the lattice constant (a) of each of the layers shown in FIG. 1 in a cross sectional direction (z) through the layers. As shown in FIG. 2, the lattice constants of the substrate 12 and seedlayer 16 are the same, while the lattice constants of the lattice matching layers 20a, 20b, 20c and 20d gradually increase to the point where the lattice constant of the uppermost layer 20d is the same as the lattice constant of the recording layer 14. Each of the lattice matching layers 20a, 20b, 20c and 20d thus has a slightly different lattice constant, which can be adjusted by selective doping of the layers. Different doping materials may increase or decrease the lattice constant of the layers. The change of concentration of the doping materials gradually changes the lattice constant.

The lowermost lattice matching layer 20a of the graded lattice matching structure 20 has a lattice constant substantially matching the lattice constant of the seed layer 16 and the substrate 12, i.e., within 0.05 Å of each other, typically within 0.02 Å of each other. The uppermost lattice matching layer 20d has a lattice constant substantially matching the lattice constant of the recording layer 14, i.e., within 0.05 Å of each other, typically within 0.02 Å of each other.

In accordance with an embodiment of the present invention, the graded lattice matching layers 20a, 20b, 20c and 20d comprise metal alloys. For example, the metal alloys may comprise CuPt with varying amounts of Cu and Pt which provide layers with gradually increasing or decreasing lattice constants.

In accordance with another embodiment, the graded lattice matching layers 20a, 20b, 20c and 20d may comprise oxides. For example, the oxides may comprise STO, SRO, LSCO or LSTO. The oxides may be doped with elements such as Nb, La and/or Ba in order to control the lattice constant of each layer.

In accordance with the present invention, the use of the graded lattice matching structure 20 provides improved surface smoothness and polarization value of the recording layer 14. For example, the recording layer 14 may have a surface smoothness of less than 4 or 5 Å rms. Furthermore, the recording layer 14 may have a polarization value of greater than 50 microC/cm$^2$. The recording layer 14 may be capable of achieving extremely high recording densities, e.g., greater than 500 Gbit/in$^2$. For example, the recording layer 14 may have a recording density of greater than 1 Tbit/in$^2$.

In accordance with an embodiment of the present invention, at least one conductive layer (not shown) may be deposited between the graded lattice matching structure 20 and the recording layer 14. For example, the conductive layer(s) may comprise SRO, doped STO, doped SiGe, doped SRO, LSCO or LSTO, and may have a typical thickness of from about 50 to about 500 nm. The dopants added to the STO, SiGe and SRO may be any type of known elemental dopant which provides the desired level of electrical conductivity to the film.

An embodiment of the present invention provides a method of controlling the lattice constants of an interfacial layer structure to better fit the structural and electrical requirements for an epitaxial ferroelectric or magnetic film deposited on a Si (100) wafer, e.g., for use in high density data storage. The gradual adjustment of the lattice mismatch between the Si substrate and the ferroelectric or magnetic toplayer leads to significantly improved structural and electrical properties of the latter.

The present multi-layer recording structures may be made by any suitable deposition process. For example, the seed layer, lattice matching layer and recording layer may be deposited by conventional physical vapor deposition (PVD), chemical vapor deposition (CVD), molecular beam epitaxy (MBE), or photolithic deposition (PLD) techniques. The recording layer 14 may be deposited directly on the upper lattice matching layer 20d. Alternatively, a conductive layer (not shown) may be deposited on the upper lattice matching layer 20d before the recording layer 14 is deposited.

An embodiment of the present invention provides for the fabrication of highly textured seed layers on Si using simple magnetron sputtering at room temperature. The deposited films are of high quality and have sharp and abrupt interfaces between the deposited film and the substrate. For example, copper may be deposited on the Si substrate, followed by deposition of a graded index (GRIN) binary alloy made up of a transition metal element with Cu. Highly oriented FePt and SrRuO$_3$ films may then be deposited on the Si substrate with a (200) texture.

Figure 4:
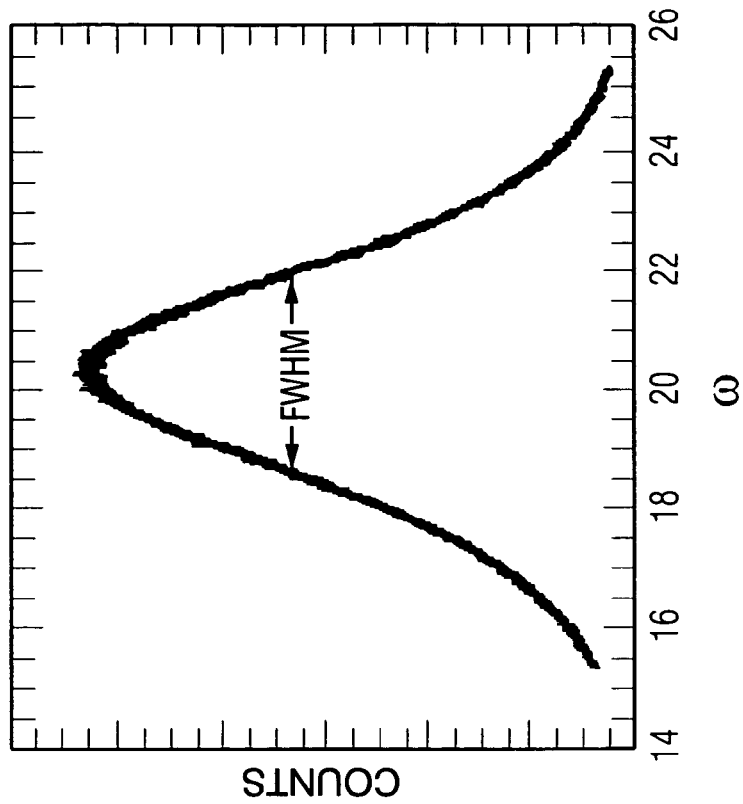
FIGS. 3 and 4 are X-ray diffraction scans illustrating a highly textured Cu film oriented in the (200) direction deposited on a Si substrate.
Figure 3:
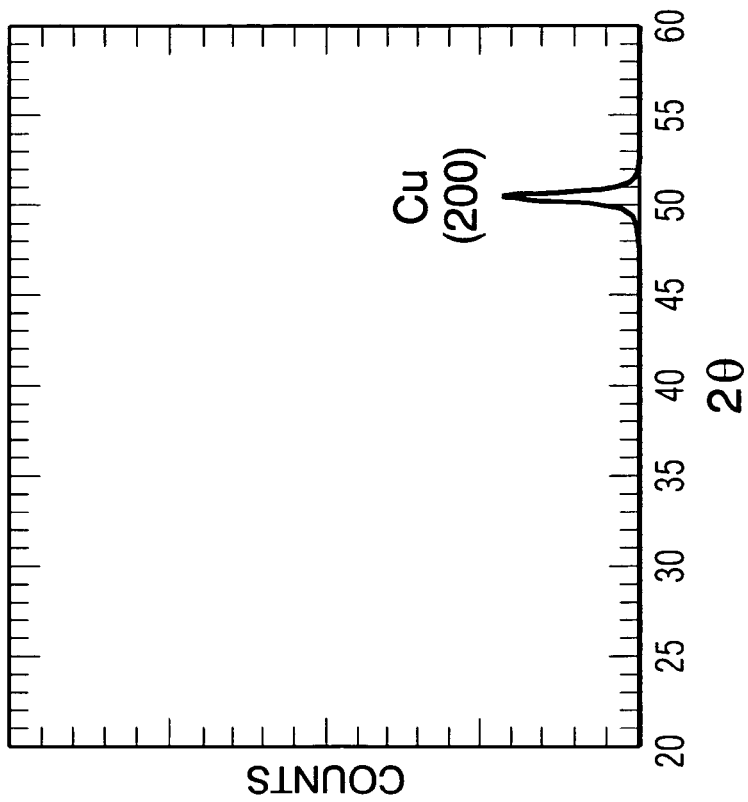

In one embodiment, the substrate 12 is etched prior to deposition of the seed layer 16. For example, Si or other substrate materials may be etched by contacting the substrate with hydrogen fluoride, followed by sequential deposition of the lattice matching layers 20a, 20b, 20c and 20d. A single crystal Si substrate may be thus treated with an HF etch to remove the native oxide layer. The HF acid not only removes the native oxide but also hydrogen terminates dangling Si bonds at the surface. The substrate is then immediately placed in vacuum and Cu film is deposited to a thickness of 100 nm or less using magnetron sputtering. FIGS. 3 and 4 show structural characterization data (x-ray diffraction scans) of such a thin film, indicating a highly textured film oriented in the (200) direction with no other peaks present. The film texture has a narrow rocking curve (FIG. 4) of less than 3 degrees that is quite good for a sputtered film. This single layer film provides the primary layer upon which a GRIN alloy may be grown.

In accordance with this embodiment of the invention, the graded index metallic alloy buffer layer may be used to fabricate highly textured underlayers to be used as thin film templates for epitaxial growth in magnetic recording and probe storage device applications. The primary layer of Cu (100) grown on HF etched Si (100) may be used as the starting point. Any suitable type of crystal structure and lattice parameter can be designed by selection of the appropriate alloying elements based upon miscibility with Cu. This technique does not require high temperature deposition and allows for the fabrication of highly oriented buffer layers with a small spread in the crystal grains. A recording layer, such as an L1$_0$ phase FePt film, may then be deposited on the graded lattice matching layers.

Figure 5:
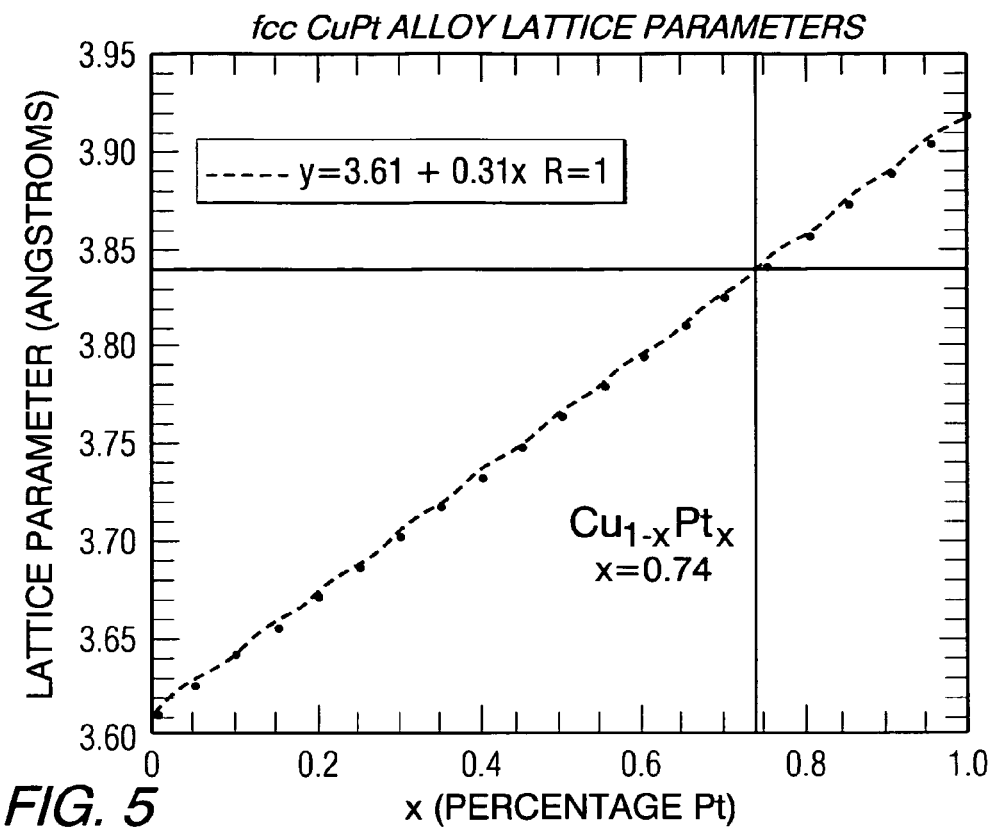
FIG. 5 is a graph of lattice parameter versus percentage of Pt for a CuPt alloy, demonstrating the ability to alter the lattice parameter of the alloy by controlling the relative amounts of Cu and Pt.
Figure 6:
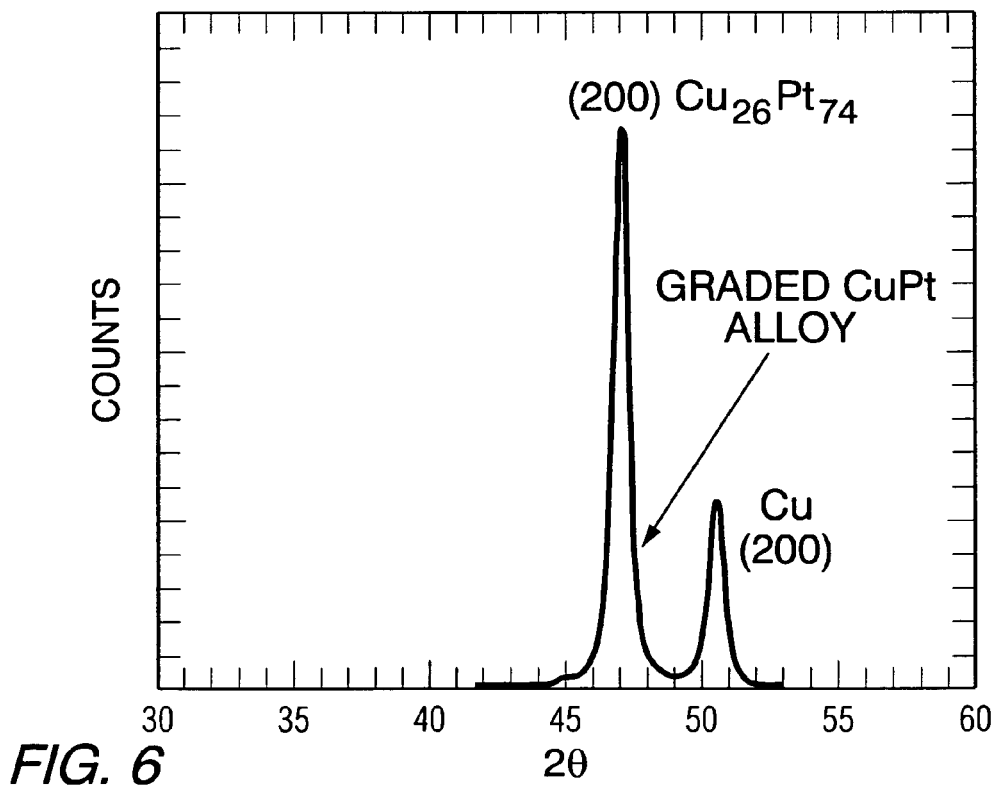
FIG. 6 is an X-ray diffraction scan of a Cu seed layer and CuPt lattice matching layer, illustrating the ability of the CuPt lattice matching layer to match the lattice parameter of an FePt recording layer.
Figure 7:
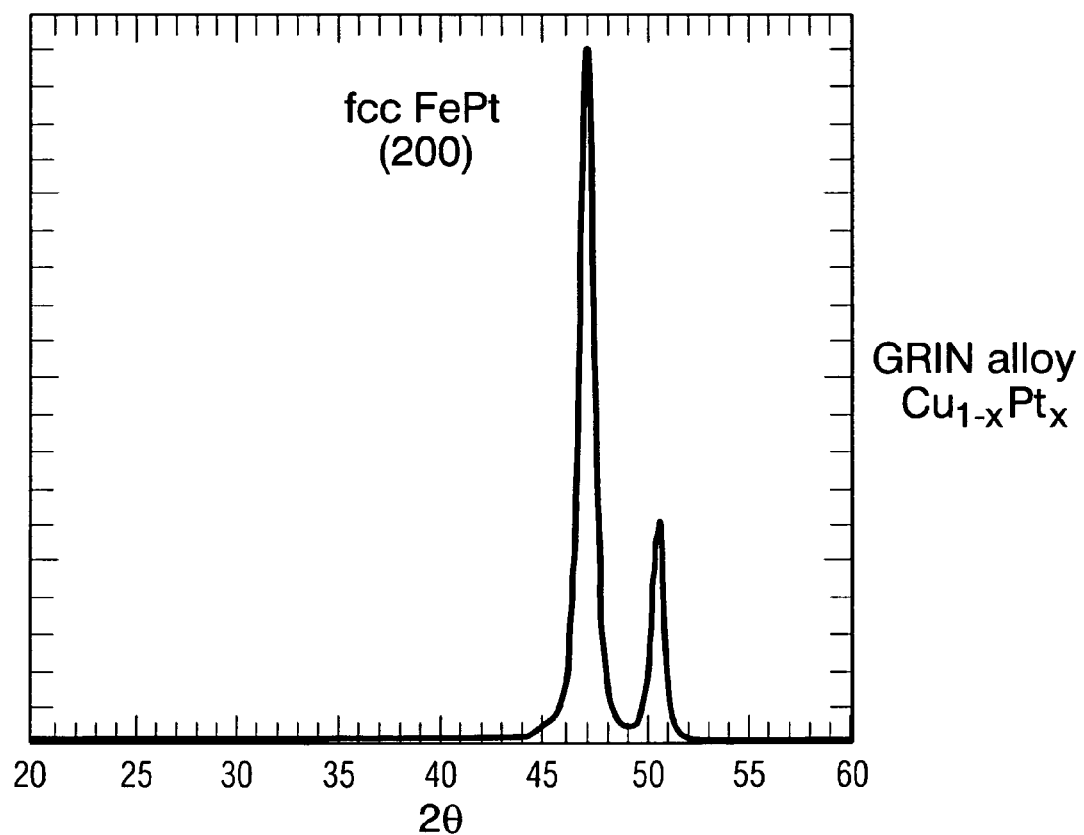
FIG. 7 is an X-ray diffraction scan similar to FIG. 6, except the multilayer structure includes an Fe/Pt multilayer structure grown on top of the CuPt lattice matching layers, indicating the lattice match between the CuPt underlayer and Fe/Pt multilayer structure.

The L1$_0$ phase of FePt has an in-plane lattice parameter of 3.84 Å, and the underlying seed layer should also have essentially the same lattice parameter. Since the primary Cu surface layer has a lattice spacing of 3.61 Å, a GRIN alloy of CuPt may be used to expand the lattice parameter of pure Cu to 3.84 Å. In FIG. 5, the lattice parameter vs. atomic concentration (x) for Cu$_{1-x}$Pt$_x$ alloys is shown. At a value of x=0.74 the lattice parameter of Cu$_{26}$Pt$_{74}$ exactly matches the (a) lattice parameter of FePt. A high angle x-ray scan is shown in FIG. 6. In this example, the graded alloy is taken past the optimal Pt concentration, and then the Pt concentration is reduced to the optimal value of x=0.74. This allows for a stress release in the alloy. The GRIN alloy is only a few nanometers thick and may be varied over a relatively wide range. The high angle x-ray data shown in FIG. 6 only shows two peaks, the Cu (200) and the CuPt (200). There is an enhancement of the right shoulder of the CuPt peak due to the graded alloy. With the optimal lattice parameter of 3.84 Å, a Fe/Pt multilayer is grown on top and the corresponding high angle x-ray data is shown in FIG. 7, indicating epitaxial growth.

Figure 8:
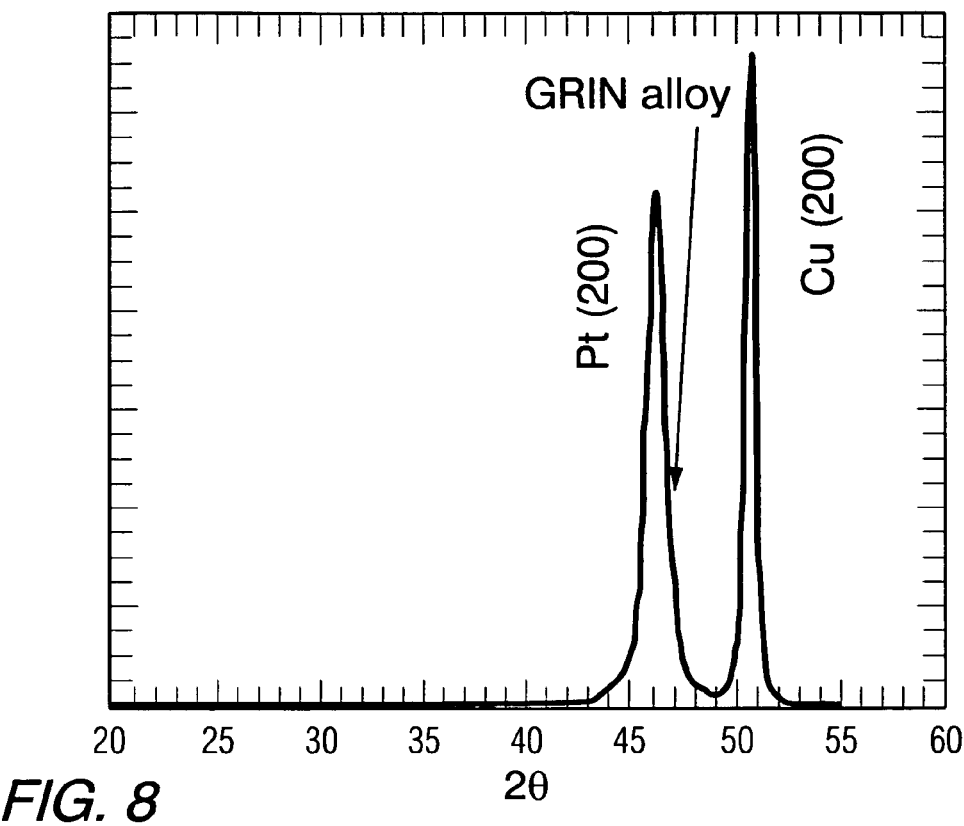
FIG. 8 is an X-ray diffraction scan of a structure including a Cu seed layer and Pt lattice matching layer, illustrating the formation of a highly textured Pt (200) film.

In accordance with another embodiment of the invention, highly textured Pt (200) may be deposited on a Si substrate. High angle x-ray data is shown in FIG. 8. No other peaks exist in the x-ray spectra. The rocking curve is small (<3 deg.) and the film has an rms roughness less than 1 nm as measured using atomic force microscopy (AFM). Using the Pt (200) seed layer with a lattice parameter of 3.92 Å (bulk Pt), the perovskite structure SrRuO$_3$ (SRO) can be epitaxially grown on top having a (200) texture as well. A 50 nm SRO film may be grown on the Pt (200) buffer. SRO is a metallic oxide that may be used as a seed layer for ferroelectric materials such as PZT. Due to lattice matching and high conductivity makes this material ideal for a bottom electrode for FRAM applications. Most PZT thin film applications use SrTiO$_3$ (STO) single crystal substrate in the following configuration: PZT/SRO/STO. Unfortunately, STO substrates are rather expensive. Using the present GRIN alloy approach, the desired results can be achieved in a less expensive and less complicated way.

Figure 9:
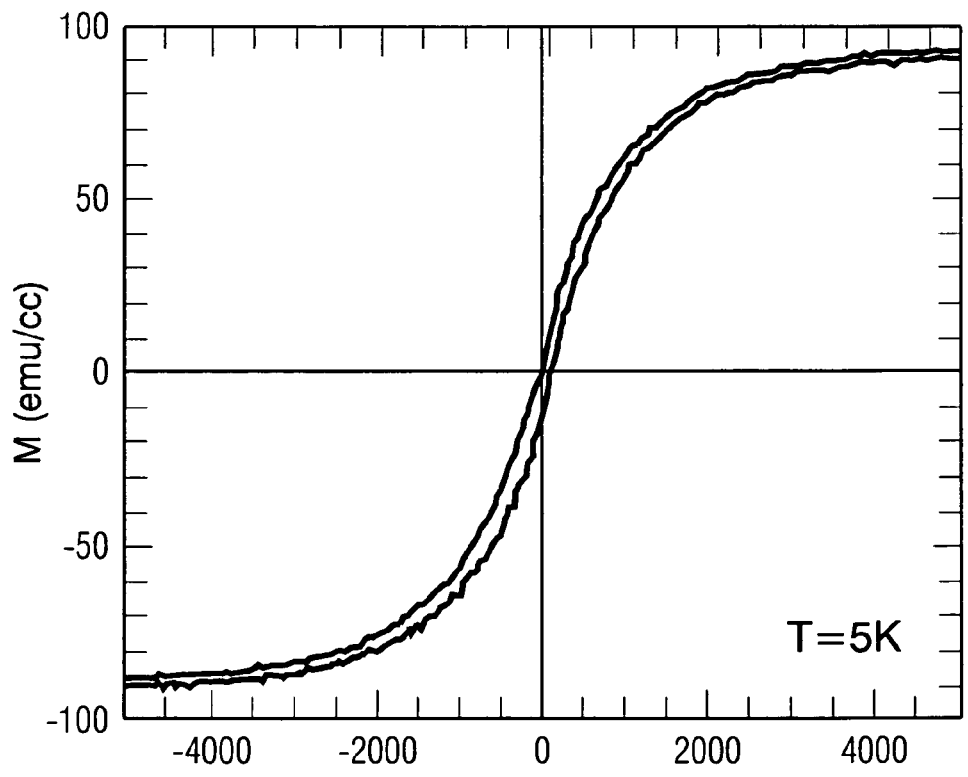
FIG. 9 illustrates a hysteresis loop of a SrRuO$_3$ (SRO) ferromagnetic structure including lattice matching layers.

SRO is also an itinerant ferromagnet such that the conduction electrons in the material couple together to give rise to a magnetic moment. SRO has a Curie temperature of 155K and displays ferromagnetic behavior below this temperature. In FIG. 9, a hysterisis loop of the sample stack measured at 5K is shown. The material is magnetic at low temperature.

An oxide material which may be used for the lattice matching layers is strontium titanate (STO). STO has a lattice constant of a=3.905 Å. A typical doping material m to increase the lattice constant would be niobium, lanthanum, ruthenium or barium as well as oxygen deficiency. A typical doping material for decreasing the lattice constant is calcium. Nb, La and Ru doped STO is conducting and therefore can act as a bottom electrode. A Si$_{1-x}$Ge$_x$ buffer layer may be used. The lattice constant in (110) direction of Si$_{1-x}$Ge$_x$ can be described by $\alpha_{Si1-x,Gex}=0.384+0.014142x+0.019092x^2$ (nm), where x is the atomic fraction of germanium in Si$_{1-x}$Ge$_x$. When x=0.42, the lattice constant of the Si$_{1-x}$Ge$_x$ buffer layer equals to the lattice constant of the STO film.

The lattice constant of LSTO changes from 3.905 Å (SrTiO$_3$) to 3.92 Å (LaTiO$_3$). The (Sr$_x$Ru$_{1-x}$)TiO$_3$ lattice constant varies from 3.905 Å SrTiO$_3$) to 3.95 Å (SrRuO$_3$). The (Ba$_x$Sr$_{1-x}$)TiO$_3$ lattice constant varies from 3.90 (SrTiO$_3$) to 4.01 (BaTiO$_3$). In-plane and out-of-plane of BaTiO$_3$ lattice constants may change with doping concentrations up to 5%. The (Ca$_x$Sr$_{1-x}$)TiO$_3$ lattice constant varies from 3.84 (CaTiO$_3$ matches a Si substrate) to 3.90 (SrTiO$_3$). In SBN (SrBi$_2$Nb$_2$O$_9$) layers, increasing the concentration of Ba, increases the lattice constant of SBN, while Ca has the opposite effect.

Figure 10:
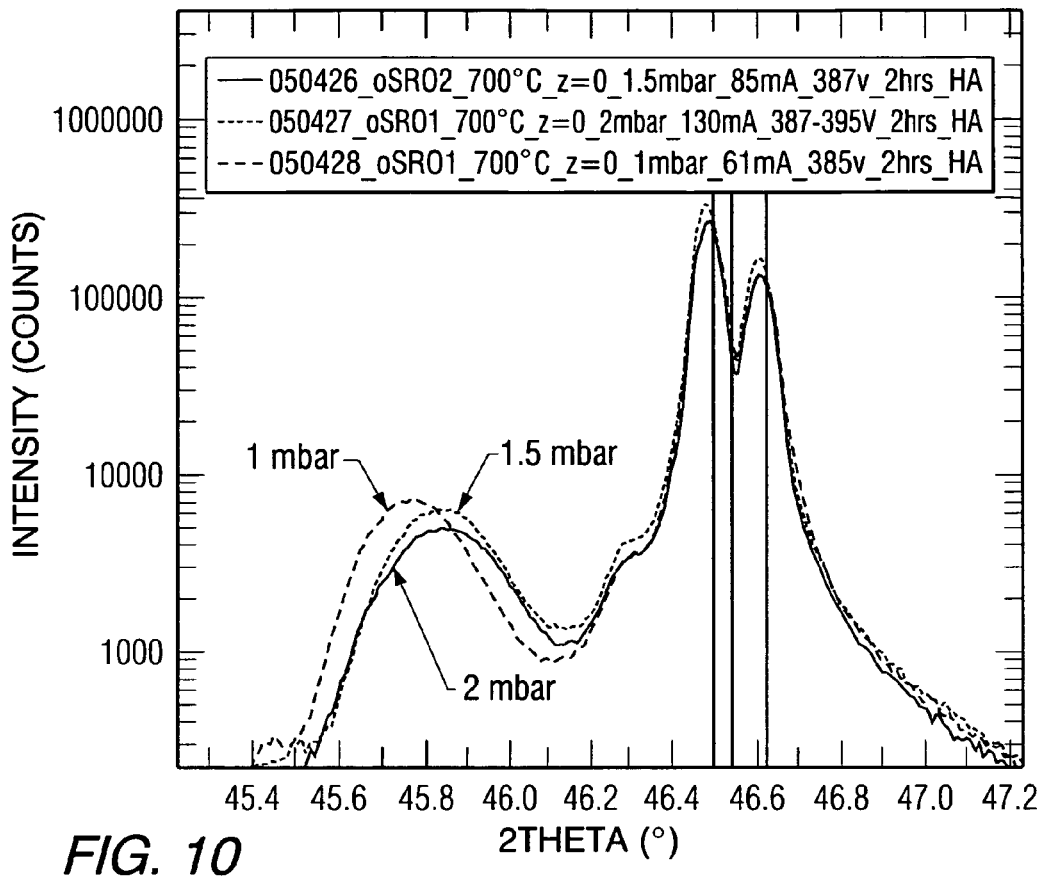
FIG. 10 includes X-ray diffraction scans from different SRO films sputtered at different oxygen pressures.

XRD studies (shown in FIG. 10) illustrate that the lattice constants of the SRO film vary with sputtering pressure. At lower oxygen pressure (1 mbar), the SRO expands due to the oxygen deficiency. At higher pressures (1.5 and 2 mbar) the lattice constants of the SRO films are closer to the bulk value. The XRD θ-2θ scans of FIG. 10 show the SRO peaks shifted along with the sputtering pressures. The SRO peak grown at 1 mbar shifts to the lower angle meaning the lattice expansion of the films from the Bragg's Law. The corresponding plot of the lattice constant to the sputtering pressure is shown in FIG. 11.

Figure 11:
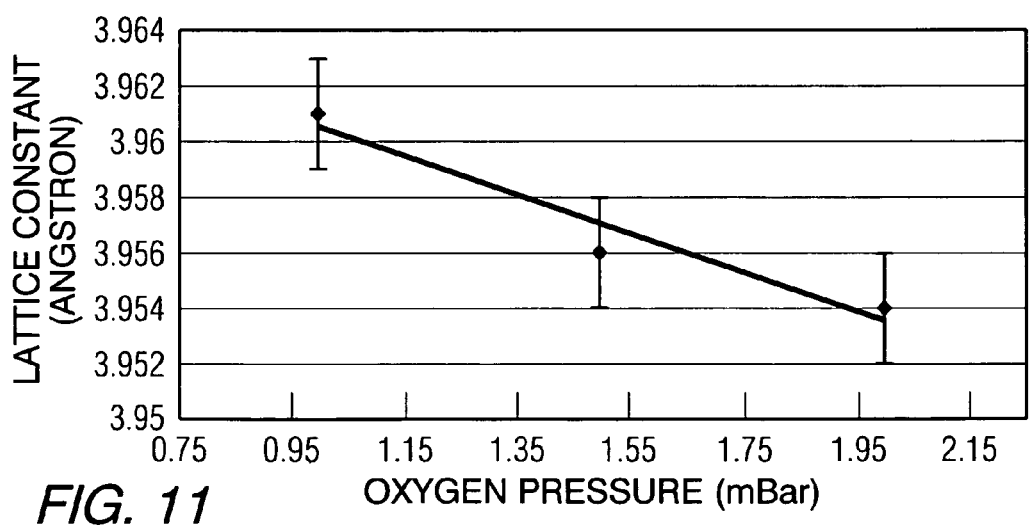
FIG. 11 is a graph of lattice constant versus oxygen pressure for the SRO films of FIG. 10.

The plot of FIG. 11 shows the relationship between the oxygen sputter pressure to the SRO lattice constant. At lower sputtering pressure (1 mbar) the lattice expands due to the oxygen deficiency. At higher oxygen pressure (2 mbar) the lattice constant is close to the bulk value reported.

Figure 12:
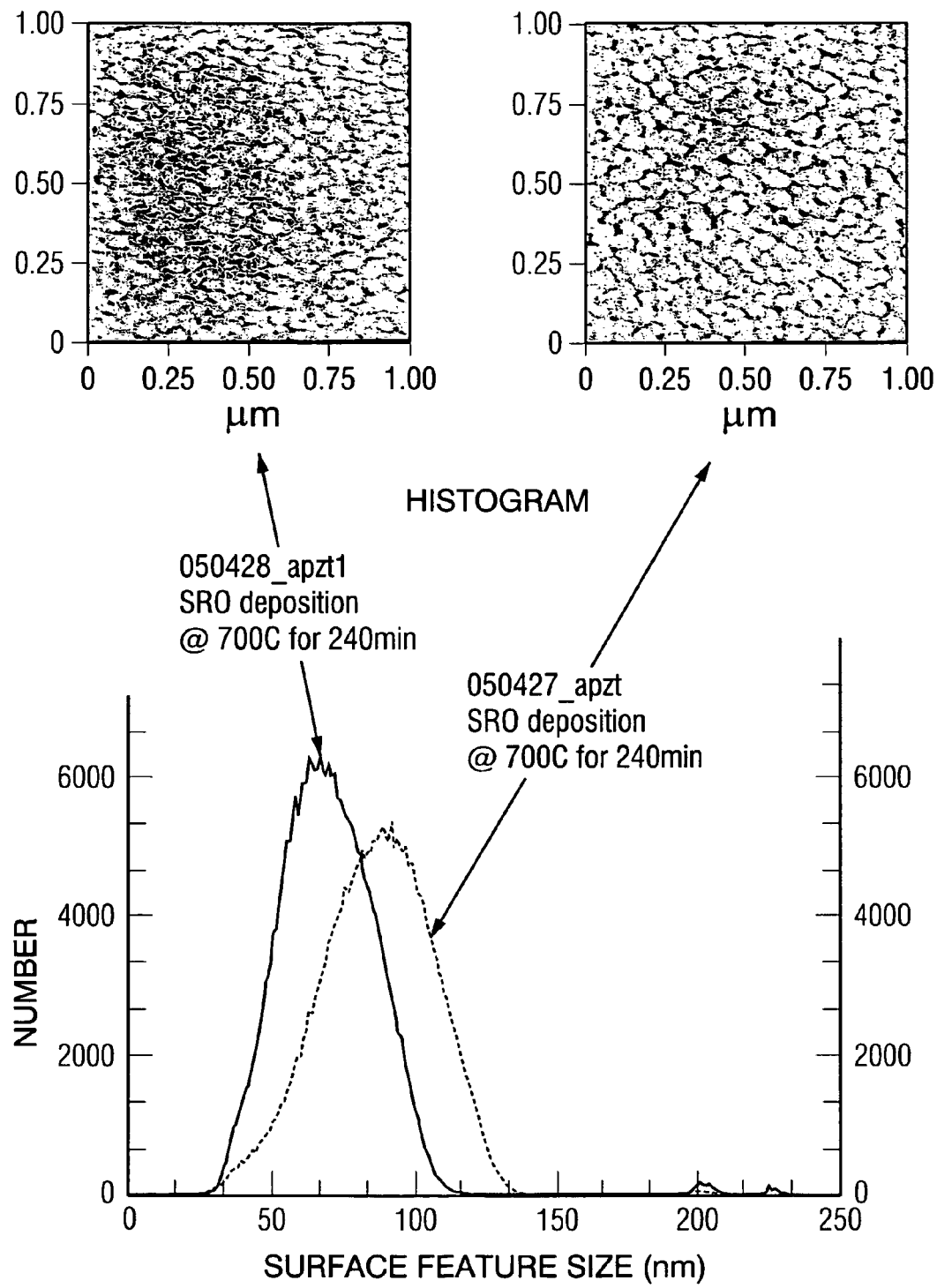
FIG. 12 illustrates two different surface morphologies of PZT films deposited under similar conditions on SRO underlayers having different lattice constants, along with a graph showing the different surface feature sizes of the PZT films.

FIG. 12 shows AFM images of the surface morphology of PZT films deposited under identical conditions on SRO underlayers with different lattice constants, verified by XRD measurements. The SRO lattice constant of the film on the left hand side of FIG. 12 is slightly larger than that of the right side of FIG. 12, leading to a significantly decreased surface feature size of the PZT film.

Whereas particular embodiments of this invention have been described above for purposes of illustration, it will be evident to those skilled in the art that numerous variations of the details of the present invention may be made without departing from the invention as defined in the appended claims.

The invention claimed is:

1. An epitaxial recording medium structure comprising:
   a single crystal Si substrate having a lattice constant;
   a Cu (200) seed layer deposited on the substrate having a lattice constant substantially matching the substrate lattice constant;
   graded CuPt (200) lattice matching layers deposited on the seed layer comprising a lowermost matching layer and an uppermost lattice matching layer; and
   a magnetic material recording layer comprising $L1_0$ FePt deposited on the graded lattice matching layers, wherein the lowermost lattice matching layer has a lattice constant substantially matching the seed layer lattice constant, and the uppermost lattice matching layer has a lattice constant substantially matching a lattice constant of the recording layer.

2. The epitaxial recording medium structure of claim 1, comprising from 2 to 40 of the lattice matching layers.

3. The epitaxial recording medium structure of claim 1, wherein the lattice constant of each lattice matching layer is within 0.05 Å of each adjacent lattice matching layer.

4. The epitaxial recording medium structure of claim 1, wherein the lattice constant of the lowermost lattice matching layer is within 0.05 Å of the lattice constants of the seed layer and the substrate, and the lattice constant of the uppermost lattice matching layer is within 0.05 Å of the lattice constant of the recording layer.

5. The epitaxial recording medium structure of claim 1, wherein each lattice matching layer has a thickness of from about 4 to about 100 nm.

6. The epitaxial recording medium structure of claim 1, wherein the graded lattice matching layers have a total thickness of from about 10 to about 200 nm.

7. The epitaxial recording medium structure of claim 1, wherein the recording layer has a thickness of from about 10 to about 50 nm.

8. The epitaxial recording medium structure of claim 1, wherein the recording layer has a surface smoothness of less than 5 Å rms.

9. A ferroelectric epitaxial recording medium structure comprising:
   a single crystal Si substrate having a lattice constant;
   a Pt (200) seed layer deposited on the substrate having a lattice constant substantially matching the substrate lattice constant;
   graded $SrRuO_3$ (200) lattice matching layers deposited on the seed layer comprising a lowermost lattice matching layer and an uppermost lattice matching layer; and
   a PZT ferroelectric material recording layer deposited on the graded lattice matching layers, wherein the lowermost lattice matching layer has a lattice constant substantially matching the seed layer lattice constant, and the uppermost lattice matching layer has a lattice constant substantially matching a lattice constant of the recording layer, wherein the recording layer has a polarization value of greater than 30 microC/$cm^2$.

10. The epitaxial recording medium structure of claim 9, further comprising at least one conductive layer between the graded lattice matching layers and the recording layer.

11. The epitaxial recording medium structure of claim 10, wherein the at least one conductive layer comprises SRO, doped STO, doped SiGe or LSCO.

12. A magnetic recording medium structure comprising:
   a single crystal Si substrate having a lattice constant;
   a Cu (200) seed layer deposited on the substrate having a lattice constant substantially matching the substrate lattice constant;
   graded CuPt (200) lattice matching layers deposited on the seed layer comprising a lowermost lattice matching layer and an uppermost lattice matching layer; and
   a magnetic material recording layer comprising $CoPt_3$ deposited on the graded lattice matching layers, wherein the lowermost lattice matching layer has a lattice constant substantially matching the seed layer lattice constant, and the uppermost lattice matching layer has a lattice constant substantially matching a lattice constant of the recording layer.

13. The epitaxial recording medium structure of claim 1, wherein the FePt has an easy axis of magnetization lying orthogonal to a plane of the recording layer.

* * * * *